(No Model.)
G. T. JONES.
INDESTRUCTIBLE ACCOUNT BOOK AND WRAPPER OR COVER FOR THE SAME.
No. 307,052. Patented Oct. 21, 1884.
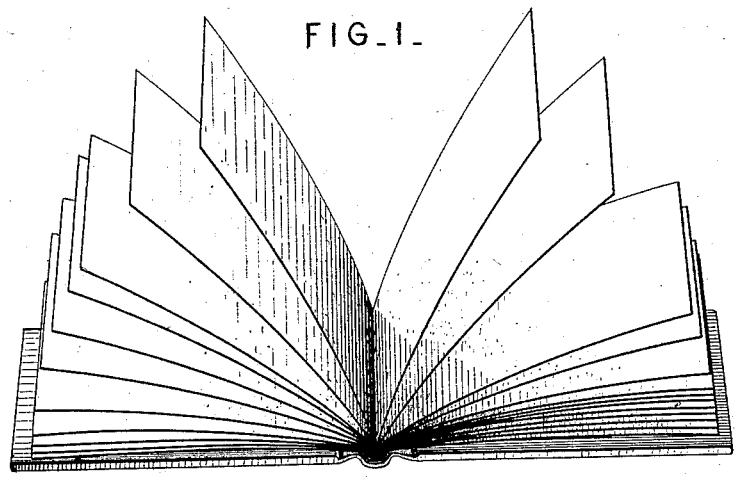
Fig. I.
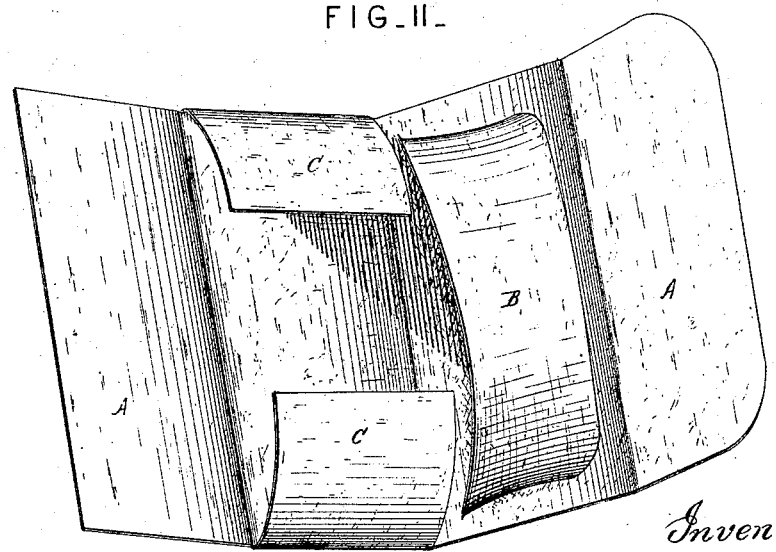
Fig. II.

UNITED STATES PATENT OFFICE.

GEORGE T. JONES, OF CINCINNATI, OHIO.

INDESTRUCTIBLE ACCOUNT-BOOK AND WRAPPER OR COVER FOR THE SAME.

SPECIFICATION forming part of Letters Patent No. 307,052, dated October 21, 1884.

Application filed July 28, 1884. (No model.)

*To all whom it may concern:*

Be it known that I, GEORGE T. JONES, a citizen of the United States, residing at Cincinnati, in the county of Hamilton and State of Ohio, have invented certain new and useful Improvements in Indestructible Account-Books and Wrappers or Covers for the Same and other Objects, of which the following is a specification.

The invention relates more particularly to the production of an account-book the leaves, covers, and backs of which shall be indestructible by fire; but the invention is equally applicable to the production of indestructible covers or wrappers for any collection of paper or similar material, bound or unbound.

To this end my invention consists in manufacturing the paper and pasteboard of which the leaves, covers, and backs of account-books or other above-named objects are made, and also the thread and cord used for connecting the parts, of stock in which, with any suitable vegetable fiber—but preferably palmetto fiber—a sufficient quantity of asbestus is thoroughly mixed to preserve the structure of the different parts of the book, wrapper, &c., intact after passing through fire or a sufficient degree of heat to destroy the vegetable fiber.

In carrying out my invention I prefer to take palmetto fiber and work this up in the engine with a sufficient proportion of disintegrated asbestus fiber for the object stated, the vegetable and mineral fibers being thoroughly and intimately mingled and the whole reduced to pulp, from which the paper and pasteboard are manufactured after usual modes. With the paper and pasteboard thus produced I make books, wrappers, or portfolios of any description by the customary processes of sewing and binding, either with twine and cord made of mixed vegetable and asbestus fiber, or by the use of wire or staples, either alone or in addition to the fiber thread, in any customary manner. I have made paper from equal parts of asbestus and palmetto fiber with good success; but I propose to use one part of asbestus fiber to one, two, or three parts of palmetto or other vegetable fiber, as may be preferred. Books constructed in this manner can be used with ordinary ink, and the writing and figures will remain legible on the indestructible fiber after the combustible vegetable fiber has all been burned away.

In the accompanying drawings, Figure I represents a memorandum-book of ordinary form, which may be made of my improved material. Fig. II represents a form of wrapper or pocket-book which may be made according to my invention, the whole—cover A, pouch B, and flaps C—being made of asbestus paper prepared as above described, and adapted to contain papers and documents in the ordinary way.

I do not claim the manufacture of roofing and packing by the combination of asbestus with vegetable or animal fibers, as certain coarse fabrics of the kind are well known. Neither do I claim in the present application the manufacture of indestructible fine paper for checks, bonds, and other printed instruments or documents, which part of my invention is reserved for and will form the subject-matter of another application.

Having thus described my invention, what I claim as new therein, and desire to secure by Letters Patent, is—

1. As an article of manufacture, a book, book-cover, wrapper, or similar object made from pulp composed of asbestus mixed with a suitable binding material, substantially as described.

2. The process of making sheets of asbestus paper for subseqent manufacture into books, wrappers, &c., which consists in thoroughly mingling asbestus and vegetable fiber and reducing them to pulp, from which articles are made in the ordinary way.

GEO. T. JONES.

Witnesses:
 OCTAVIUS KNIGHT,
 GEO. L. WHEELOCK.